United States Patent
Long

(10) Patent No.: US 9,860,857 B2
(45) Date of Patent: Jan. 2, 2018

(54) TRANSMIT POWER CONTROL METHOD AND SYSTEM, AND SENDING APPARATUS

(71) Applicant: HUAWEI TECHNOLOGIES CO., LTD., Shenzhen (CN)

(72) Inventor: Hao Long, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 14/996,644

(22) Filed: Jan. 15, 2016

(65) Prior Publication Data

US 2016/0135134 A1    May 12, 2016

Related U.S. Application Data

(63) Continuation of application No. PCT/CN2013/079476, filed on Jul. 16, 2013.

(51) Int. Cl.
*G08C 17/00* (2006.01)
*H04W 52/38* (2009.01)
(Continued)

(52) U.S. Cl.
CPC .......... *H04W 52/38* (2013.01); *H04W 52/02* (2013.01); *H04W 52/08* (2013.01);
(Continued)

(58) Field of Classification Search
None
See application file for complete search history.

(56) References Cited

U.S. PATENT DOCUMENTS

| 6,456,856 | B1 | 9/2002 | Werling et al. |
| 2006/0135079 | A1* | 6/2006 | Barnett ............... H04B 7/0608 |
| | | | 455/69 |

(Continued)

FOREIGN PATENT DOCUMENTS

| CN | 1250234 | 4/2000 |
| CN | 1514560 | 7/2004 |

(Continued)

OTHER PUBLICATIONS

International Search Report, dated Apr. 16, 2014, in corresponding International Application No. PCT/CN2013/079476 (12 pp.).

(Continued)

*Primary Examiner* — Kibrom T Hailu
(74) *Attorney, Agent, or Firm* — Staas & Halsey LLP

(57) ABSTRACT

The present invention discloses a transmit power control method and system, and a sending apparatus. The method includes the following steps: acquiring first information that is used to adjust transmit power for sending a first signal; acquiring power of each working channel; and determining a to-be-adjusted working channel according to an adjustment step, the first information, and the power of each working channel, so as to adjust the transmit power for sending the first signal. According to the foregoing manner, the present invention can adjust transmit power for sending a first signal, avoid saturation of an automatic transmit power control apparatus, and save energy.

11 Claims, 3 Drawing Sheets

(51) Int. Cl.
H04W 52/50 (2009.01)
H04W 52/08 (2009.01)
H04W 52/34 (2009.01)
H04W 52/02 (2009.01)
H04W 52/36 (2009.01)

(52) U.S. Cl.
CPC ......... *H04W 52/346* (2013.01); *H04W 52/50* (2013.01); *H04W 52/362* (2013.01); *H04W 52/367* (2013.01); *Y02B 60/50* (2013.01)

(56) References Cited

U.S. PATENT DOCUMENTS

2010/0210235 A1    8/2010  Ulupinar et al.
2011/0044296 A1*   2/2011  Zhang ................. H04B 7/0404
                                              370/336

FOREIGN PATENT DOCUMENTS

| CN | 101834644 | 9/2010 |
| CN | 102752836 | 10/2012 |
| EP | 1583256 | 10/2005 |
| WO | WO2008/025885 | 3/2008 |

OTHER PUBLICATIONS

Extended European Search Report, dated May 11, 2016, in corresponding European Application No. 13889419.1 (9 pp.).
*Change Request: Introduction to Dual-Cell HSDPA Opeartion on Adjacent Carriers*, 3GPP TSG-RAN WG1 Meeting #54, R1-083399, Jeju, Korea, Aug. 18-22, 2008, (7 pp.).
International Search Report dated Apr. 16, 2014, in corresponding International Patent Application No. PCT/CN2013/079476.

* cited by examiner

TRANSMIT POWER CONTROL METHOD AND SYSTEM, AND SENDING APPARATUS

CROSS-REFERENCE TO RELATED APPLICATIONS

This application is a continuation of International Application No. PCT/CN2013/079476, filed on Jul. 16, 2013, which is hereby incorporated by reference in its entirety.

TECHNICAL FIELD

The present invention relates to the field of communications technologies, and in particular, to a transmit power control method and system, and a sending apparatus.

BACKGROUND

At present, a phased array technology has a promising application prospect in subsequent millimeter wave communication, where a beam direction is adjustable, so that effects of strong winds, shaking, and the like can be resisted. Effects of a factor such as rain fade need to be considered in design and deployment of a microwave system; therefore, relatively high transmit power is usually configured. However, in an actual running process, the system mostly runs in a scenario having no rain, and if highest transmit power is used, a receiving end is saturated, thereby causing unnecessary power consumption.

SUMMARY

Embodiments of the present invention provide a transmit power control method and system, and a sending apparatus, to resolve a problem of unnecessary power consumption caused by saturation of a receiving end.

A first aspect provides a transmit power control method, including: acquiring first information that is used to adjust transmit power for sending a first signal; acquiring power of each working channel; and determining a to-be-adjusted working channel according to an adjustment step, the first information, and the power of each working channel, so as to adjust the transmit power for sending the first signal.

With reference to the implementation manner of the first aspect, in a first possible implementation manner, the determining a to-be-adjusted working channel according to an adjustment step, the first information, and the power of each working channel, so as to adjust the transmit power for sending the first signal includes: if the first information requests to increase the transmit power, enabling the to-be-adjusted working channel; and if the first information requests to reduce the transmit power, disabling the to-be-adjusted working channel.

With reference to the first possible implementation manner of the first aspect, in a second possible implementation manner, the method further includes: acquiring phase shifts of the multiple working channels before the adjustment, and phase shifts of the multiple working channels after the adjustment; and if the phase shifts of the multiple working channels after the adjustment are different from the phase shifts of the multiple working channels before the adjustment, adjusting the phase shifts of the multiple working channels after the adjustment, so that the phase shifts of the multiple working channels after the adjustment are the same as the phase shifts of the multiple working channels before the adjustment.

With reference to the first aspect to the second possible implementation manner of the first aspect, in a third possible implementation manner, the first information includes ATPC request information or level information.

A second aspect provides a sending apparatus, including a sending apparatus, where the sending apparatus includes a control unit and multiple working channels, the control unit acquires first information that is used to adjust transmit power for sending a first signal, and acquires power of each working channel, and the control unit determines a to-be-adjusted working channel according to an adjustment step, the first information, and the power of each working channel, so as to adjust the transmit power for sending the first signal by the sending apparatus.

With reference to the implementation manner of the second aspect, in a first possible implementation manner, the sending apparatus further includes a power supply, and each of the working channels includes a control switch, a power amplifier, and an antenna, where the power supply is connected to the power amplifier through the control switch, the antenna is connected to the power amplifier, and a control end of the control switch is connected to the control unit.

With reference to the first possible implementation manner of the second aspect, in a second possible implementation manner, if the first information requests to increase the transmit power, the control unit controls the control switch of the to-be-adjusted working channel to be turned on, so as to enable the to-be-adjusted working channel; and if the first information requests to reduce the transmit power, the control unit controls the control switch of the to-be-adjusted working channel to be turned off, so as to disable the to-be-adjusted working channel.

With reference to the second possible implementation manner of the second aspect, in a third possible implementation manner, the sending apparatus further includes multiple phase shifters, the phase shifters are connected to the working channels; the control unit acquires phase shifts of the multiple working channels before the adjustment, and phase shifts of the multiple working channels after the adjustment; and if the phase shifts of the multiple working channels after the adjustment are different from the phase shifts of the multiple working channels before the adjustment, the control unit adjusts, by using the multiple phase shifters, the phase shifts of the multiple working channels after the adjustment, so that the phase shifts of the multiple working channels after the adjustment are the same as the phase shifts of the multiple working channels before the adjustment.

With reference to the second aspect to the third possible implementation manner of the second aspect, in a fourth possible implementation manner, the first information includes ATPC request information or level information.

A third aspect provides a transmit power control method, including: acquiring a first signal from a sending apparatus; comparing quality of the first signal with a threshold, and generating first information according to a comparison result; and sending the first information to the sending apparatus, so as to adjust transmit power for sending the first signal by the sending apparatus.

With reference to the implementation manner of the third aspect, in a first possible implementation manner, the comparing quality of the first signal with a threshold, and generating first information according to a comparison result includes: if the quality of the first signal is greater than the threshold, requesting, by the first information, the sending apparatus to reduce the transmit power; and if the quality of the first signal is less than the threshold, requesting, by the first information, the sending apparatus to increase the transmit power.

A fourth aspect provides an automatic transmit power control apparatus, including: a receiving unit, a processing unit, and a sending unit, where the receiving unit acquires a first signal from a sending apparatus, the processing unit compares quality of the first signal with a threshold, and generates first information according to a comparison result, and the sending unit sends the first information to the sending apparatus, so as to adjust transmit power for sending the first signal by the sending apparatus.

With reference to the implementation manner of the fourth aspect, in a first possible implementation manner, if the quality of the first signal is greater than the threshold, the first information requests the sending apparatus to reduce the transmit power; and if the quality of the first signal is less than the threshold, the first information requests the sending apparatus to increase the transmit power.

A fifth aspect provides a transmit power control system, including: a sending apparatus and an automatic transmit power control apparatus, where the sending apparatus is the sending apparatus according to any one of the second aspect to the fourth possible implementation manner of the second aspect, and the automatic transmit power control apparatus is the automatic transmit power control apparatus according to either of the fourth aspect to the first possible implementation manner of the fourth aspect.

By using the foregoing solutions, beneficial effects of the present invention are as follows: in the present invention, first information that is used to adjust transmit power for sending a first signal is acquired; power of each working channel is acquired; and a to-be-adjusted working channel is determined according to an adjustment step, the first information, and the power of each working channel, so as to adjust the transmit power for sending the first signal, thereby avoiding saturation of an automatic transmit power control apparatus, and saving energy.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
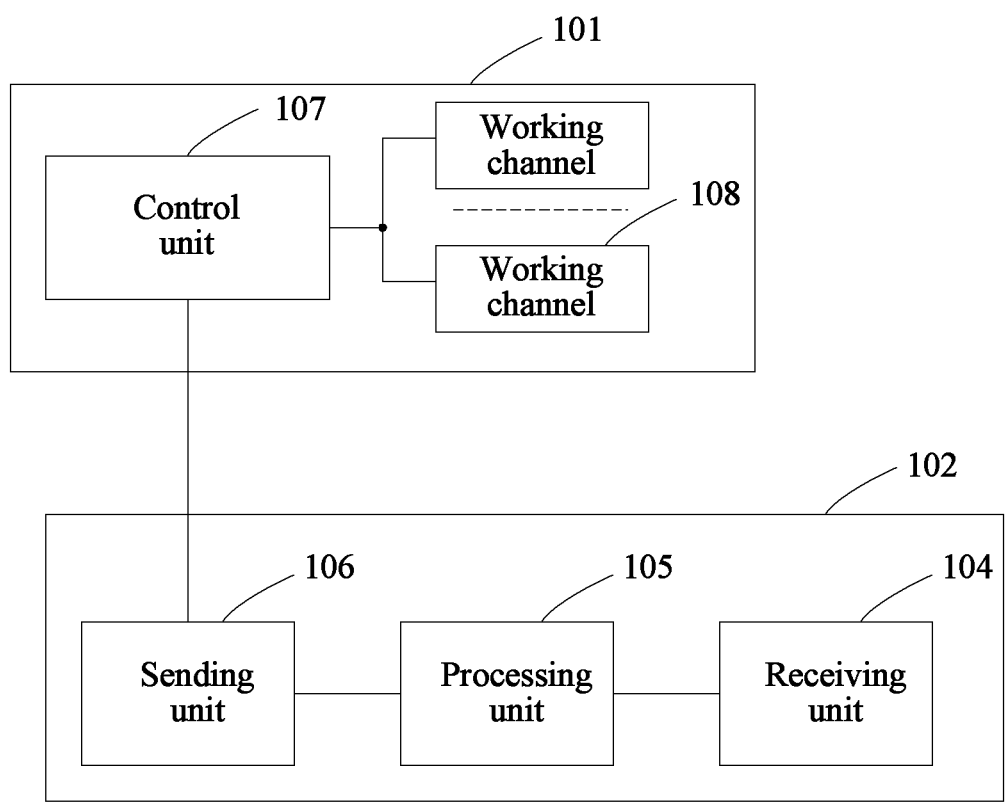
FIG. 1 is a schematic structural diagram of a transmit power control system according to a first embodiment of the present invention.

Referring to FIG. 1, FIG. 1 is a schematic structural diagram of a transmit power control system according to a first embodiment of the present invention. As shown in FIG. 1, the transmit power control system disclosed by this embodiment includes: a sending apparatus 101 and an automatic transmit power control (ATPC) apparatus 102.

In this embodiment, the automatic transmit power control apparatus 102 includes a receiving unit 104, a processing unit 105, and a sending unit 106, where the receiving unit 104 acquires a first signal from the sending apparatus 101; the processing unit 105 is connected to the receiving unit 104, and acquires the first signal from the receiving unit 104; the processing unit 105 presets a threshold, compares quality of the first signal with a threshold, and generates first information according to a comparison result; and the sending unit 106 acquires the first information from the processing unit 105, and sends the first information to the sending apparatus 101.

The sending apparatus 101 includes a control unit 107 and multiple working channels 108, and the control unit 107 acquires, from the sending unit 106, the first information that is used to adjust transmit power for sending the first signal, and acquires power of each working channel 108. The control unit 107 presets a adjustment step, and determines a to-be-adjusted working channel 108 according to the adjustment step, the first information, and the power of each working channel 108, so as to adjust the transmit power for sending the first signal by the sending apparatus 101, which can avoid saturation of the automatic transmit power control apparatus 102, and save energy.

Figure 2:
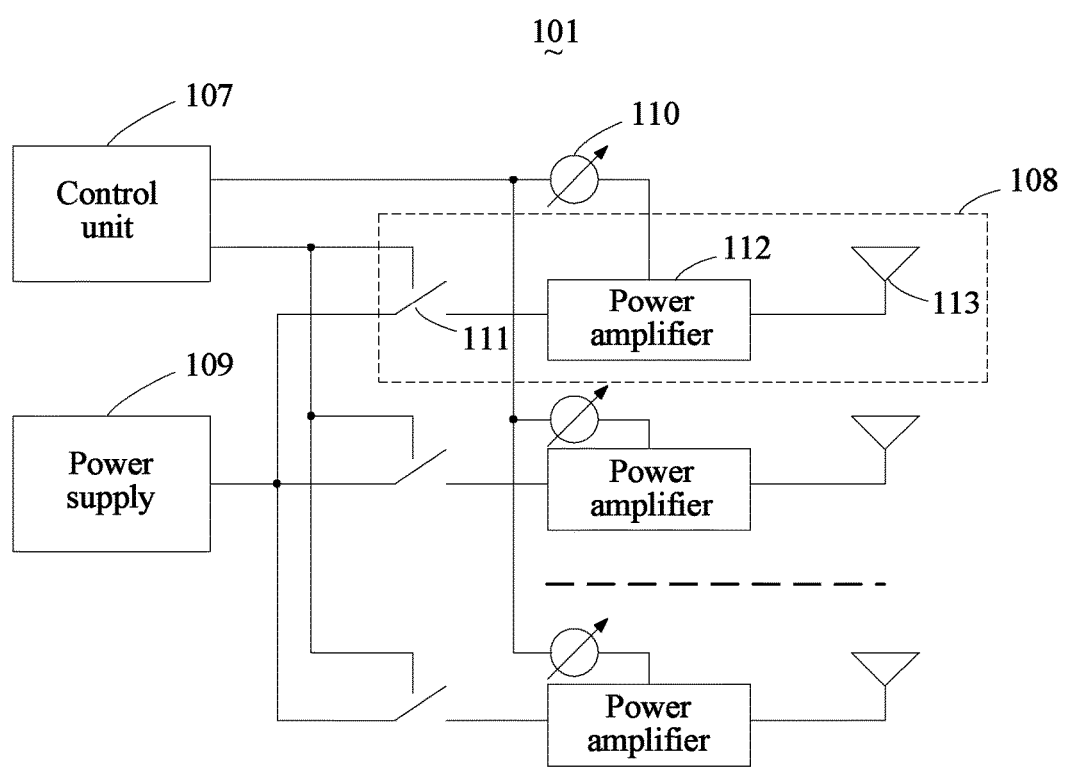
FIG. 2 is a schematic structural diagram of a sending apparatus in a transmit power control system according to a second embodiment of the present invention.

The present invention further provides a transmit power control system of a second embodiment, which is described in detail based on the transmit power control system disclosed by the first embodiment. As shown in FIG. 2, the sending apparatus 101 disclosed by this embodiment further includes a power supply 109 and multiple phase shifters 110, where the phase shifters 110 are connected to the working channels 108.

In this embodiment, each working channel 108 includes a control switch 111, a power amplifier 112, and an antenna 113. The power supply 109 is connected to the power amplifier 112 through the control switch 111, so as to supply power to the power amplifier 112; the power amplifier 112 is connected to the antenna 113; a control end of the control switch 111 is connected to the control unit 107; and the control unit 107 controls the control switch 111 to be turned on or turned off. Optionally, a person skilled in the art may use another switch device to substitute the control switch 111, for example, a transistor or a field effect transistor.

The processing unit 105 of the automatic transmit power control apparatus 102 compares the quality of the first signal with the threshold; if the quality of the first signal is greater than the threshold, the first information generated by the processing unit 105 requests the sending apparatus 101 to reduce the transmit power; if the quality of the first signal is less than the threshold, the first information generated by the processing unit 105 requests the sending apparatus 101 to increase the transmit power; and if the quality of the first signal is equal to the threshold, the first information generated by the processing unit 105 requests the sending apparatus 101 to keep the transmit power unchanged.

In this embodiment, the control unit 107 acquires the power of each working channel 108, and presets an adjustment step. The control unit 107 determines a to-be-adjusted working channel 108 according to the first information, the adjustment step, and the power of each working channel 108. If the first information requests the sending apparatus 101 to increase the transmit power, the control unit 107 controls a control switch 111 of the to-be-adjusted working channel 108 to be turned on, so as to enable the to-be-adjusted working channel 108. If the first information requests the sending apparatus 101 to reduce the transmit power, the control unit 107 controls the control switch 111 of the to-be-adjusted working channel 108 to be turned off, so as to disable the to-be-adjusted working channel 108.

In addition, the control unit 107 acquires, from the working channels 108, phase shifts of the multiple working channels 108 before the adjustment, and phase shifts of the multiple working channels 108 after the adjustment, and if the control unit 107 determines that the phase shifts of the multiple working channels 108 after the adjustment are different from the phase shifts of the multiple working channels 108 before the adjustment, the control unit 107 adjusts the phase shifts of the multiple working channels 108 by using the phase shifters 110, so that the phase shifts of the multiple working channels 108 after the adjustment are the same as the phase shifts of the multiple working channels 108 before the adjustment.

The sending apparatus 101 is described in detail below by using 16 working channels 108 as an example.

Transmit power of each working channel 108 is 10 dBm, and a gain of the antenna 113 of each working channel 108 is 15 dBi; therefore, it can be obtained that transmit power of the entire sending apparatus 101 is 12+10 dBm=22 dBm, and gains of the antennas of the entire sending apparatus 101 are 12+15 dBi=27 dBi. Therefore, effective isotropic radiated power (EIRP) of the sending apparatus 101 is 22+27 dBm=49 dBm.

The adjustment step preset by the control unit 107 is 1 dB. When the first information requests the sending apparatus 101 to reduce the transmit power, the control unit 107 determines, according to the first information, the adjustment step, and the power of each working channel 108, that two working channels 108 need to be adjusted. In addition, the control unit 107 selects, according to array distribution and a beamforming algorithm, two to-be-disabled working channels 108, so that after the two working channels 108 are disabled, a beam direction of the sending apparatus 101 is unchanged, or is changed slightly. The control unit 107 disables the two working channels 108 by controlling control switches 111 of the two to-be-disabled working channels 108 to be turned off. Therefore, the EIRP of the sending apparatus 101 after the adjustment is 10+11.46+15+ 11.46=48 dBm.

Optionally, the first information is ATPC request information, where the automatic transmit power control apparatus 102 adds the ATPC request information in frame overhead. In addition, a person skilled in the art may also set the first information to other information, for example, level information.

In this embodiment, a control unit 107 of a sending apparatus 101 determines a to-be-adjusted working channel 108 according to first information, an adjustment step, and power of each working channel, and adjusts the working channel 108 by controlling a control switch 111 of the to-be-adjusted working channel 108, to adjust transmit power for sending a first signal by the sending apparatus 101, which has low costs, and can avoid saturation of an automatic transmit power control apparatus 102, and save energy.

Figure 3:
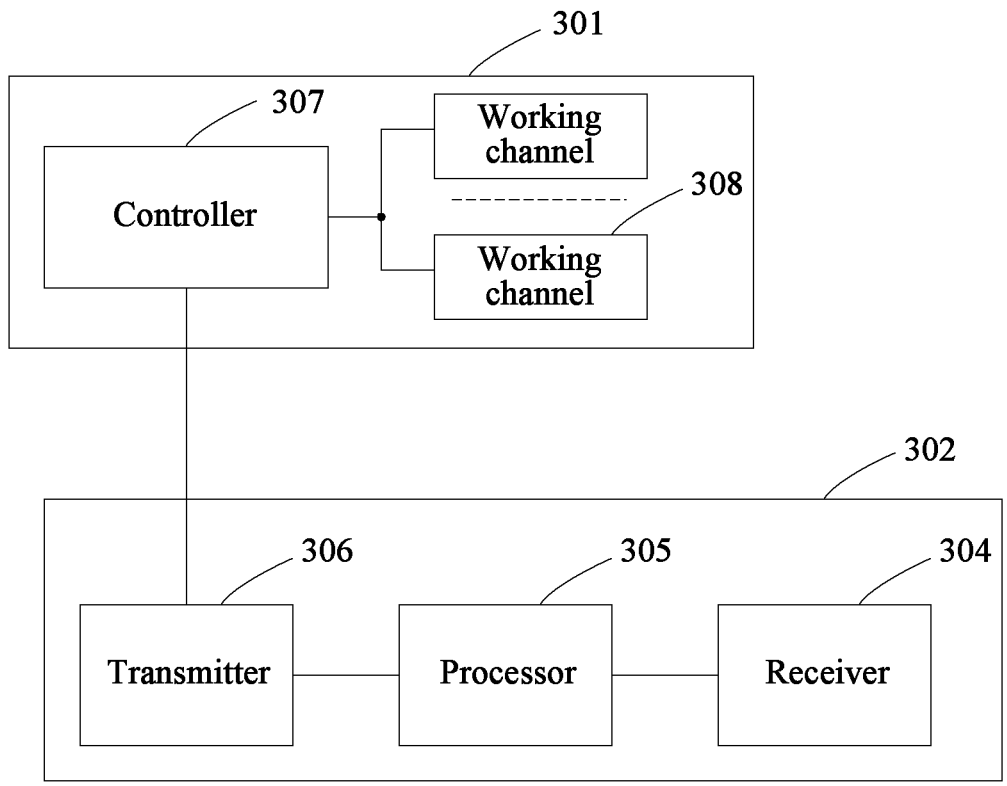
FIG. 3 is a schematic structural diagram of a transmit power control system according to a third embodiment of the present invention.

Referring to FIG. 3, FIG. 3 is a schematic structural diagram of a transmit power control system according to a third embodiment of the present invention. As shown in FIG. 3, the transmit power control system disclosed by this embodiment includes: a sending apparatus 301 and an automatic transmit power control apparatus 302.

In this embodiment, the automatic transmit power control apparatus 302 includes a receiver 304, a processor 305, and a transmitter 306, where the receiver 304 acquires a first signal from the sending apparatus 301, and the processor 305 is connected to the receiver 304, and acquires the first signal from the receiver 304; the processor 305 presets a threshold, compares quality of the first signal with a threshold, and generates first information according to a comparison result; and the transmitter 306 acquires the first information from the processor 305, and sends the first information to the sending apparatus 301.

The sending apparatus 301 includes a controller 307 and multiple working channels 308, where the controller 307 acquires, from the transmitter 306, the first information that is used to adjust transmit power for sending the first signal, and acquires power of each working channel 308. The controller 307 presets a adjustment step, and determines a to-be-adjusted working channel 308 according to the adjustment step, the first information, and the power of each working channel 308, so as to adjust the transmit power for sending the first signal by the sending apparatus 301, which can avoid saturation of the automatic transmit power control apparatus 302, and save energy.

Figure 4:
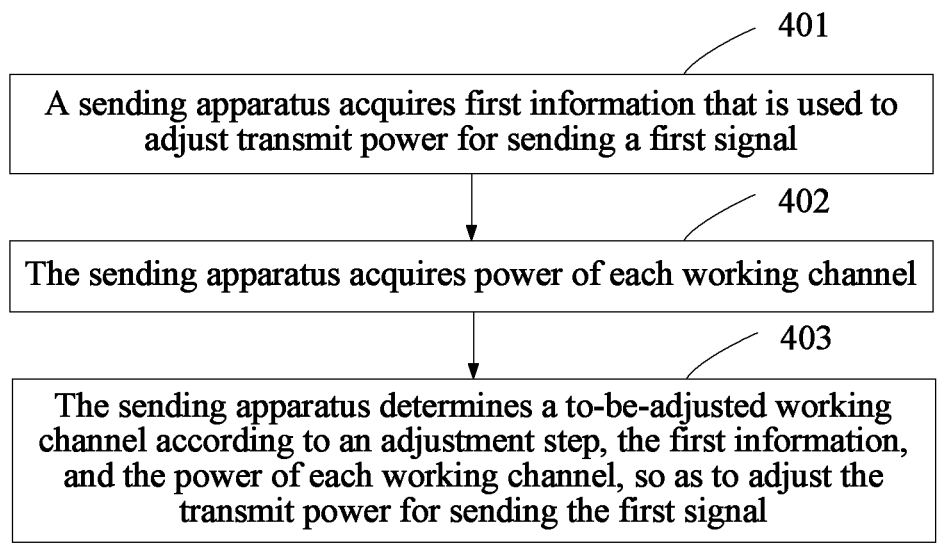
FIG. 4 is a flowchart of a transmit power control method according to a first embodiment of the present invention.

The present invention further provides a transmit power control method of a first embodiment, which is described in detail based on the transmit power control system disclosed by the first embodiment. As shown in FIG. 4, the method disclosed by this embodiment includes the following steps:

Step 401: The sending apparatus 101 acquires first information that is used to adjust transmit power for sending a first signal.

Step 402: The sending apparatus 101 acquires power of each working channel 108.

Step 403: The sending apparatus 101 determines a to-be-adjusted working channel 108 according to an adjustment step, the first information, and the power of each working channel 108, so as to adjust the transmit power for sending the first signal.

In this embodiment, a sending apparatus 101 acquires first information that is used to adjust transmit power for sending a first signal, and power of each working channel 108, and determines a to-be-adjusted working channel 108 according to an adjustment step, the first information, and the power of each working channel 108, so as to adjust the transmit power for sending the first signal by the sending apparatus 101, which can avoid saturation of an automatic transmit power control apparatus 102, and save energy.

The present invention further provides a transmit power control method of a second embodiment, which is described in detail based on the transmit power control system disclosed by the second embodiment.

In step 401, a sending apparatus 101 acquires, from an automatic transmit power control apparatus 102, first information that is used to adjust transmit power for sending a first signal.

The automatic transmit power control apparatus 102 compares quality of the first signal with a preset threshold, and generates the first information according to a comparison result. If the quality of the first signal is greater than the threshold, the first information generated by the automatic transmit power control apparatus 102 requests the sending apparatus 101 to reduce the transmit power; if the quality of the first signal is less than the threshold, the first information generated by the automatic transmit power control apparatus 102 requests the sending apparatus 101 to increase the transmit power; and if the quality of the first signal is equal to the threshold, the first information generated by the automatic transmit power control apparatus 102 requests the sending apparatus 101 to keep the transmit power unchanged.

In step 403, the sending apparatus 101 presets an adjustment step, and determines a to-be-adjusted working channel 108 according to the first information, the adjustment step, and power of each working channel 108. If the first information requests the sending apparatus 101 to increase the transmit power, the sending apparatus 101 enables the to-be-adjusted working channel 108. If the first information requests the sending apparatus 101 to reduce the transmit power, the sending apparatus 101 disables the to-be-adjusted working channel 108. In addition, the sending apparatus 101 acquires, from the working channels 108, phase shifts of the multiple working channels 108 before the adjustment, and phase shifts of the multiple working channels 108 after the adjustment, and if the phase shifts of the multiple working channels 108 after the adjustment are different from the phase shifts of the multiple working channels 101 before the adjustment, the sending apparatus 101 adjusts the phase shifts of the multiple working channels 108, so that the phase shifts of the multiple working channels 108 after the adjustment are the same as the phase shifts of the multiple working channels 108 before the adjustment.

In conclusion, in the present invention, a sending apparatus acquires first information that is used to adjust transmit power for sending a first signal, and power of each working channel, and determines a to-be-adjusted working channel according to an adjustment step, the first information, and power of each working channel, which adjusts the transmit power for sending the first signal by the sending apparatus, has low costs, and can avoid saturation of an automatic transmit power control apparatus, and save energy.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:
1. A transmit power control method comprising:
acquiring first information that is used to adjust transmit power for sending a first signal;
acquiring power of each of a plurality of working channels;
determining, from among the plurality of working channels, a to-be-adjusted working channel according to an adjustment step, the first information, and the power of each of the plurality of working channels;
adjusting the to-be-adjusted working channel to thereby adjust so as to adjust the transmit power for sending the first signal;
acquiring phase shifts of the plurality of working channels before the adjusting, and phase shifts of the plurality of working channels after the adjusting;
determining whether the phase shifts of the plurality of working channels after the adjusting are different from the phase shifts of the plurality of working channels before the adjusting; and
upon determining that the phase shifts of the plurality of working channels after the adjusting are different from the phase shifts of the plurality of working channels before the adjusting, adjusting the phase shifts of the plurality of working channels after the adjusting, so that the phase shifts of the plurality of working channels after the adjusting are the same as the phase shifts of the plurality of working channels before the adjusting.

2. The method according to claim 1, wherein the adjusting the to-be-adjusted working channel comprises:
if the first information requests to increase the transmit power, enabling the to-be-adjusted working channel; and
if the first information requests to reduce the transmit power, disabling the to-be-adjusted working channel.

3. The method according to claim 1, wherein the first information comprises automatic transmit power control ATPC request information or level information.

4. A sending apparatus comprising:
a control unit;
a plurality of working channels; and
a plurality of phase shifters respectively connected to the plurality of working channels,
wherein the control unit is configured to:
acquire first information that is used to adjust transmit power for sending a first signal, and acquires power of each of the working channels,
determine, from among the plurality of working channels, a to-be-adjusted working channel according to an adjustment step, the first information, and the power of each working channel,
perform adjustment of the to-be-adjusted working channel to thereby adjust the transmit power for sending the first signal,
acquire phase shifts of the plurality of working channels before the adjustment, and phase shifts of the plurality of working channels after the adjustment,
determine whether the phase shifts of the plurality of working channels after the adjustment are different from the phase shifts of the plurality of working channels before the adjustment, and
upon determining that the phase shifts of the plurality of working channels after the adjustment are different from the phase shifts of the plurality of working channels before the adjustment, adjusts, by using the plurality of phase shifters, the phase shifts of the plurality of working channels after the adjustment, so that the phase shifts of the plurality of working channels after the adjustment are the same as the phase shifts of the plurality of working channels before the adjustment.

5. The apparatus according to claim 4, wherein
the sending apparatus further comprises a power supply,
each of the plurality of working channels comprises a control switch, a power amplifier, and an antenna, and
the power supply is connected to the power amplifier through the control switch, the antenna is connected to the power amplifier, and a control end of the control switch is connected to the control unit.

6. The apparatus according to claim 5, wherein if the first information requests to increase the transmit power, the control unit controls the control switch of the to-be-adjusted working channel to be turned on, so as to enable the to-be-adjusted working channel; and if the first information requests to reduce the transmit power, the control unit controls the control switch of the to-be-adjusted working channel to be turned off, so as to disable the to-be-adjusted working channel.

7. The apparatus according to claim 4, wherein the first information comprises ATPC request information or level information.

8. A transmit power control method comprising:
acquiring a first signal from a sending apparatus;
comparing quality of the first signal with a threshold, and generating first information according to a comparison result; and
sending the first information to the sending apparatus, so as to implement adjustment of the transmit power for sending the first signal by the sending apparatus,
wherein the sending apparatus is configured to perform:
acquiring phase shifts of a plurality of working channels of the sending apparatus before the adjustment, and phase shifts of the plurality of working channels after the adjustment;
determining whether the phase shifts of the plurality of working channels after the adjustment are different from the phase shifts of the plurality of working channels before the adjustment; and
upon determining that the phase shifts of the plurality of working channels after the adjustment are different from the phase shifts of the plurality of working channels before the adjustment, adjustment the phase shifts of the plurality of working channels after the adjustment, so that the phase shifts of the plurality of working channels after the adjustment are the same as the phase shifts of the plurality of working channels before the adjustment.

9. The method according to claim 8, wherein the comparing quality of the first signal with a threshold, and generating first information according to a comparison result comprises:
if the quality of the first signal is greater than the threshold, requesting, by the first information, the sending apparatus to reduce the transmit power; and
if the quality of the first signal is less than the threshold, requesting, by the first information, the sending apparatus to increase the transmit power.

10. An automatic transmit power control apparatus comprising:
a receiving unit;
a processing unit; and
a sending unit, wherein
the receiving unit acquires a first signal from a sending apparatus,
the processing unit compares quality of the first signal with a threshold to obtain a comparison result, and generates first information according to the comparison result,
the sending unit sends the first information to the sending apparatus, so as to implement adjustment of transmit power for sending the first signal by the sending apparatus, and
the sending apparatus is configured to perform:
acquiring phase shifts of a plurality of working channels of the sending apparatus before the adjustment, and phase shifts of the plurality of working channels after the adjustment;
determining whether the phase shifts of the plurality of working channels after the adjustment are different from the phase shifts of the plurality of working channels before the adjustment; and
upon determining that the phase shifts of the plurality of working channels after the adjustment are different from the phase shifts of the plurality of working channels before the adjustment, adjustment the phase shifts of the plurality of working channels after the adjustment, so that the phase shifts of the plurality of working channels after the adjustment are the same as the phase shifts of the plurality of working channels before the adjustment.

11. The apparatus according to claim 10, wherein the processing unit generates the first information such that:
if the quality of the first signal is greater than the threshold, the first information requests the sending apparatus to reduce the transmit power; and
if the quality of the first signal is less than the threshold, the first information requests the sending apparatus to increase the transmit power.

* * * * *